United States Patent
Momeni et al.

(10) Patent No.: US 9,749,715 B2
(45) Date of Patent: Aug. 29, 2017

(54) RECEIVER CIRCUIT AND METHOD FOR ITS OPERATION CONFIGURED TO START THE RECEPTION OF DATA SIGNALS AFTER A DELAY

(71) Applicant: Robert Bosch GmbH, Stuttgart (DE)

(72) Inventors: Massoud Momeni, Filderstadt (DE); Matthias Siemss, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 14/426,344

(22) PCT Filed: Sep. 5, 2013

(86) PCT No.: PCT/EP2013/068333
§ 371 (c)(1),
(2) Date: Mar. 5, 2015

(87) PCT Pub. No.: WO2014/040897
PCT Pub. Date: Mar. 20, 2014

(65) Prior Publication Data
US 2015/0222965 A1 Aug. 6, 2015

(30) Foreign Application Priority Data

Sep. 12, 2012 (DE) .................. 10 2012 216 142

(51) Int. Cl.
*G08B 21/00* (2006.01)
*H04Q 9/00* (2006.01)
(Continued)

(52) U.S. Cl.
CPC ............. *H04Q 9/00* (2013.01); *B60R 16/023* (2013.01); *G08C 19/02* (2013.01); *H04L 7/044* (2013.01);
(Continued)

(58) Field of Classification Search
CPC .......... B60R 16/023; B60R 2021/0104; G08C 19/02; H04L 25/0292; H04Q 2209/823
(Continued)

(56) References Cited

U.S. PATENT DOCUMENTS 5,600,634 A * 2/1997 Satoh .................... H04L 12/403
370/294
5,691,655 A * 11/1997 Geisler ............. H03K 19/01728
326/27
(Continued)

FOREIGN PATENT DOCUMENTS

DE 10 2008 044147 4/2010
GB 2 287 622 9/1995

OTHER PUBLICATIONS

International Search Report for PCT/EP2013/068333, dated Dec. 10, 2013.
(Continued)

*Primary Examiner* — Mark Rushing
(74) *Attorney, Agent, or Firm* — Norton Rose Fulbright US LLP; Gerard Messina

(57) ABSTRACT

A circuit system includes: a receiver circuit which outputs a periodic voltage pulse via a bus line; and an ascertaining device configured to ascertain whether the voltage on the bus line has reached a specified threshold value. The circuit system is configured to start the reception of data signals a specified time period after an instant at which the voltage on the bus line has reached the specified threshold value.

16 Claims, 3 Drawing Sheets

(51) Int. Cl.
    *H04L 7/04* (2006.01)
    *H04L 25/02* (2006.01)
    *B60R 16/023* (2006.01)
    *G08C 19/02* (2006.01)
    *B60R 21/01* (2006.01)

(52) U.S. Cl.
    CPC .. *H04L 25/0292* (2013.01); *B60R 2021/0104* (2013.01); *H04Q 2209/30* (2013.01); *H04Q 2209/823* (2013.01)

(58) Field of Classification Search
    USPC .................................................. 340/870.16
    See application file for complete search history.

(56) References Cited

U.S. PATENT DOCUMENTS

| | | | |
|---|---|---|---|
| 5,701,410 A | 12/1997 | Bement et al. | |
| 2001/0013803 A1* | 8/2001 | Bertin | H04L 25/0278 327/328 |
| 2010/0085101 A1* | 4/2010 | Walker | G08C 19/16 327/306 |

OTHER PUBLICATIONS

"Freescale Semiconductor Data Sheet: Technical Data PS15 Inertial Sensor MMA52xxKW Rev 8", Sep. 30, 2011, pp. 1-55.
"PS15 Perispherl Sensor Interface Specification V1.3", Jul. 29, 2008, pp. 1-46.

\* cited by examiner

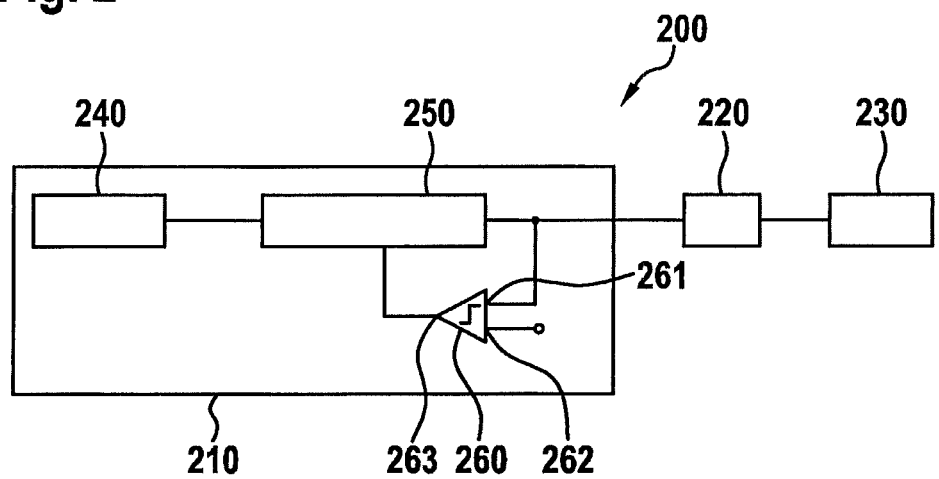
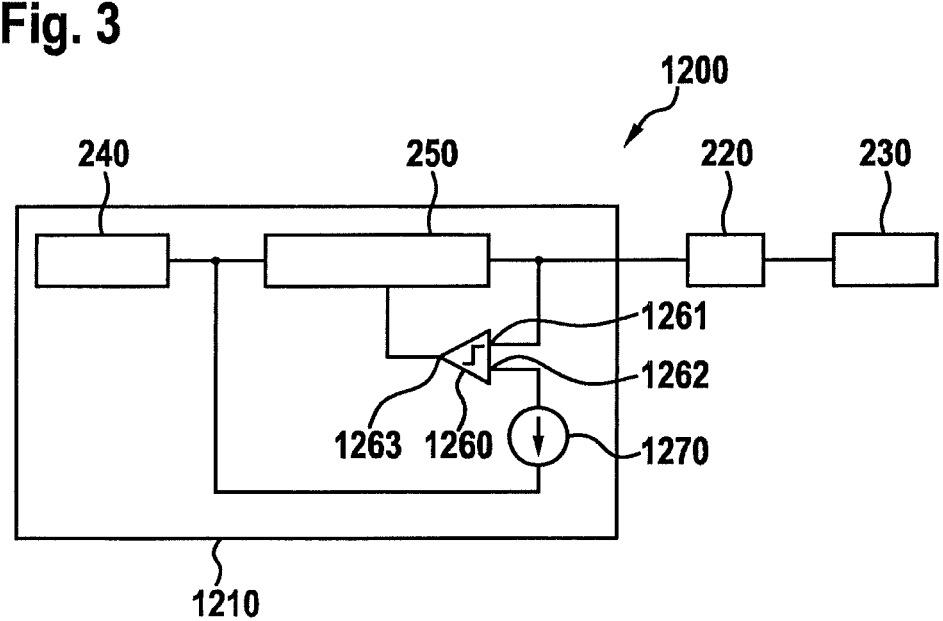

RECEIVER CIRCUIT AND METHOD FOR ITS OPERATION CONFIGURED TO START THE RECEPTION OF DATA SIGNALS AFTER A DELAY

BACKGROUND OF THE INVENTION

1. Field of the Invention

The present invention relates to a circuit system and a method for operating a receiver circuit.

2. Description of the Related Art

It is already known to use current interfaces to transmit information in a rough environment, such as for the transmission of sensor data in a motor vehicle. For example, current interfaces are used in passenger protection systems of motor vehicles for transmitting measurement data, which was recorded by peripheral sensors, to a central control unit. It is furthermore known to develop such current interfaces as buses, via which multiple sensors are connected to a central receiver. To synchronize the transmitting sensors, it is known to predefine an operating cycle in the form of a voltage pulse with the aid of the receiving control unit. Each voltage pulse marks the beginning of a new time slot, which can be used for a data transmission by a sensor.

BRIEF SUMMARY OF THE INVENTION

One object of the present invention is to provide an improved circuit system, which is developed to output a voltage pulse on a bus line. Another object of the present invention is to provide an improved passenger protection system for a motor vehicle. A further object of the present invention is to provide an improved method for operating a receiver circuit. A circuit system according to the present invention is designed to output a voltage pulse on a bus line. The circuit system has a device which is developed to determine whether a voltage on the bus line has reached a specified threshold value. The circuit system is then advantageously able to ascertain an instant at which the voltage pulse that it has output has reached the specified threshold value, which represents a trigger threshold. In this way the circuit system can advantageously determine the instant at which other users connected to the bus line likewise detect the voltage pulse that was output by the circuit system. This advantageously enables the circuit system to synchronize its own behavior in a more optimal manner with the behavior of the users connected to the bus line. Production- or operation-related time variations, such as variations due to temperature, aging and configuration influences, are able to be compensated in the process. This advantageously makes it possible to shorten the necessary time reserve buffers, so that the bus line is able to be operated at a higher data throughput.

In one specific embodiment of the circuit system, the device includes a comparator. A first input of the comparator is connected to the bus line. The circuit system is then advantageously able to use the comparator to monitor the electrical voltage applied at the bus line.

In one specific embodiment of the circuit system, the first input of the comparator is connected to the bus line via a voltage divider. This advantageously reduces the size of the voltage range to be monitored by the comparator, so that it is possible to operate the comparator at a lower supply voltage. This advantageously reduces the power consumption and the generated waste heat of the comparator. In addition, the circuit system may then have a less complex design and require less space.

In one specific embodiment of the circuit system, a second input of the comparator is connected to a voltage source. The second voltage source is then advantageously able to supply a reference voltage, which allows the comparator to ascertain whether the voltage applied at the bus line has reached the specified threshold value.

In one specific embodiment of the circuit system, the circuit system is developed to receive data signals via the bus line. The circuit system is then advantageously able to act as a receiver circuit for the reception of data signals transmitted by way of the bus line.

In one specific embodiment of the circuit system, the circuit system is developed to begin with the reception of data signals following a specified time period after the instant at which the voltage on the bus line has reached the specified threshold value. The instant ascertained by the circuit system, at which the voltage on the bus line has attained the specified threshold value, is then advantageously identical with the instant at which other users connected to the bus line detect the voltage pulse that is output by the circuit system. This provides the circuit system with very precise knowledge of a further instant at which a user situated on the bus line begins to transmit data.

A passenger protection system for a motor vehicle according to the present invention includes a sensor, a bus line and a circuit system of the type described above. The bus line in this passenger protection system may advantageously be operated at a relatively high data throughput, so that the transmission of a large number of sensor data is possible. This provides the passenger protection system with more information for detecting potentially dangerous situations.

In one preferred specific embodiment of the passenger protection system, the bus line is developed as a current interface. This bus line then advantageously allows a robust data transmission that is impervious to interference effects.

A method according to the present invention for operating a receiver circuit includes steps for outputting a voltage pulse via a bus line and for ascertaining an instant at which a voltage on the bus line attains a specified threshold value. In this way the circuit system can also determine the instant at which one or more other user(s) connected to the bus line detect(s) the voltage pulse output by the receiver circuit. This provides the receiver circuit with very precise knowledge of an instant at which another user connected to the bus line begins with the transmission of data.

In one further refinement of the method, at a specified time period following the ascertained instant another step is executed at the beginning of a data reception. In an advantageous manner, the start of the data reception is then synchronized in a very precise manner with the start of the data output.

The present invention will now be described in greater detail in the following text with reference to the attached drawing.

BRIEF DESCRIPTION OF THE DRAWINGS

FIG. 2 shows a passenger protection system according to a first specific embodiment.

FIG. 3 shows a passenger protection system according to a second specific embodiment.

DETAILED DESCRIPTION OF THE INVENTION

Figure 1:
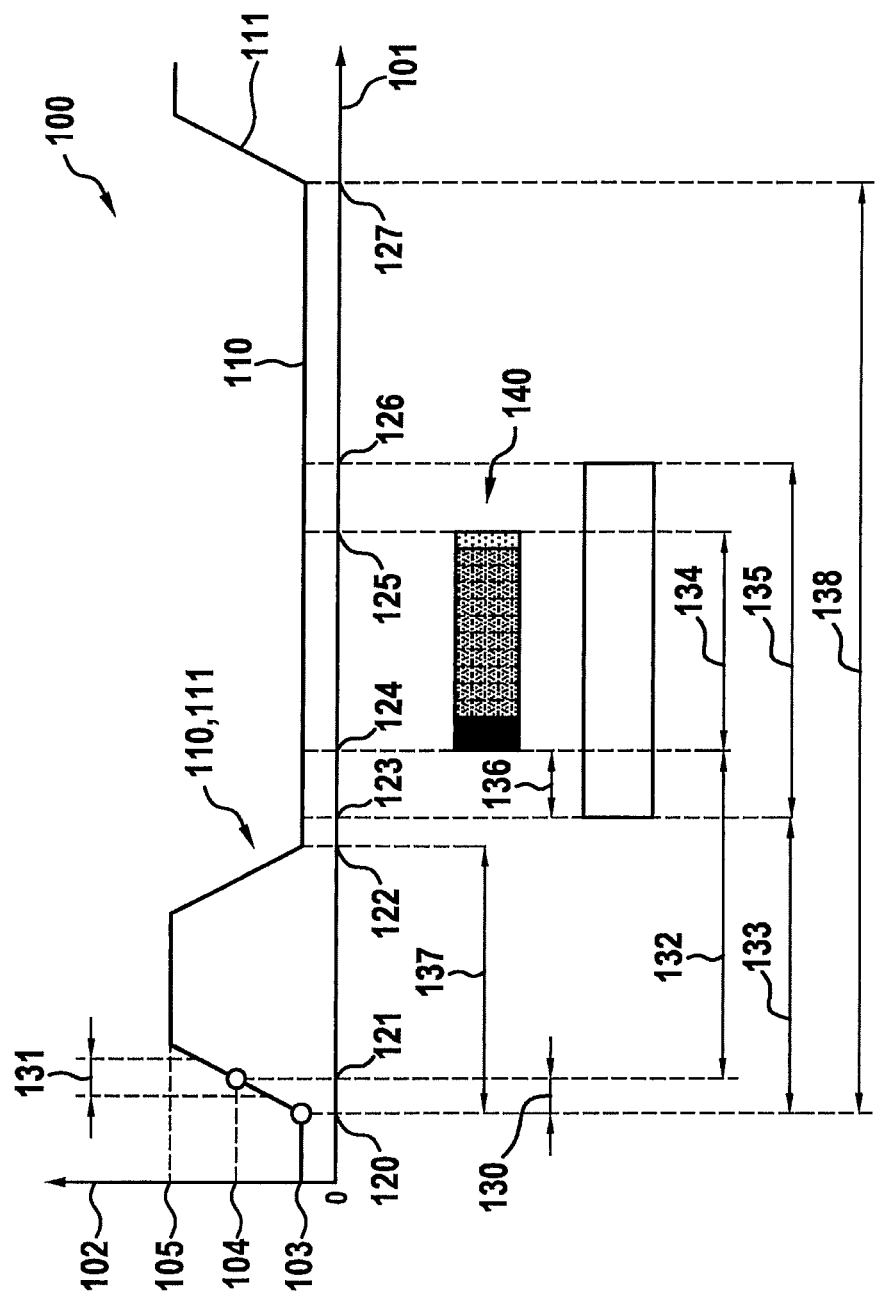
FIG. 1 shows a signal diagram of signals applied to a bus line.

FIG. 1 shows a signal diagram 100 to explain a temporal behavior during a data communication in a synchronous operation via a bus. For example, the data communication may take place in a passenger protection system of a motor vehicle and be used for transmitting sensor data from a peripheral sensor to a central control unit. In addition to the control unit, one or more sensor(s) is/are connected to the bus in this case. The bus may be a current interface, for instance. In this case the bus has a data line and a ground line. Only the data line is considered and referred to as bus line in the following text.

In the event that multiple sensors are jointly connected to the bus line, their operation needs to be synchronized. The central control unit, which serves as a receiver, defines an operating cycle in the form of periodic voltage pulses. Each voltage pulse of this type is detected by the sensors connected to the bus line and marks the start of a new time slot for a data transmission.

A time 101 has been plotted on a horizontal axis of signal diagram 100 shown in FIG. 1. A vertical axis indicates a voltage 102. Shown is a time characteristic of voltage 110 applied at the bus line. At the start, a supply voltage 103 is applied at the bus line.

At a starting instant 120, a receiver circuit connected to the bus line (e.g., a central control unit of a passenger protection system) outputs a voltage pulse 111 via the bus line. Voltage pulse 111 marks the start of a new time slot. Voltage pulse 111 has a pulse period 137 and ends at an end instant 122. After a period length 138, a further voltage pulse 111 ensues at a further starting instant 127. Voltage pulses 111 may also be called synchronization pulses.

Voltage pulse 111 output by the receiver circuit causes voltage 110 applied at the bus line to rise to a pulse amplitude voltage 105. At a trigger instant 121, which lies a rise period 130 behind starting instant 120, voltage 110 applied at the bus line has already reached a threshold value 104, which lies between supply voltage 103 and pulse amplitude voltage 105. As soon as voltage 110 applied at the bus line reaches threshold value 104, a transmitter connected to the bus line (such as a sensor of the passenger protection system, for instance) is able to detect voltage pulse 111. Trigger instant 121, at which voltage 110 applied at the bus line attains threshold value 104, may vary by a time variation 131 as a result of different influences. For example, production-related batch differences and different operating conditions, such as temperature differences, aging effects and different bus configurations, may influence the rise rate of voltage 110 applied at the bus line.

The transmitter connected to the bus line detects voltage pulse 111 at trigger instant 121, which is variable by time variation 131. Following a transmission delay time 132 specified in the transmitter, the transmitter starts with the transmission of a data word 140 via the bus line. The transmission of data word 140 begins at a transmission start instant 124 and extends over a transmission time window 134 that lasts until a transmission end instant 125 is reached.

The receiver must be able to receive data word 140 transmitted by the transmitter in its entirety. To do so, the receiver begins with a data reception at a receiving start instant 123 and continues the data reception during a receiving time window 135 until a receiving end instant 126 is reached. Receiving start instant 123 must precede transmission start instant 124. Receiving end instant 126 must follow transmission end instant 125. Transmission start instant 124, and therefore the transmission end instant 125 as well, may shift, however, on account of the variability of trigger instant 121.

One possibility for ensuring that receiving start instant 123 lies before transmission start instant 124 is to place receiving start instant 123 later than start instant 120 by a receiver delay time 133 measured from start instant 120, and to dimension receiver delay time 133 in such a way that a time safety interval 136 results between receiving start instant 123 and transmission start instant 124, which in all instances is greater than time variation 131 of trigger instant 121. However, large time safety interval 136 required for this purpose reduces the utilizable length of receiving time window 135 and thereby sets an upper limit for the data quantity that is transmittable per time unit. Shortening time safety interval 136, on the other hand, would reduce the robustness of the data transmission via the bus line.

It is therefore more advantageous if the receiver also has knowledge of trigger instant 121, at which the transmitter detects voltage pulse 111 on the bus line. In this case, the receiver is able to very precisely determine the instant at which the transmitter begins with the transmission of data word 140. The receiver is then able to start with the data reception at precisely this instant or very shortly prior to this instant. Since the transmitter starts with the transmission of data once transmission delay time 132 has elapsed following trigger instant 121, the receiver is able to start the receiving of data after a slightly shorter time than transmitter delay time 132 has elapsed following trigger instant 121.

Figure 4:
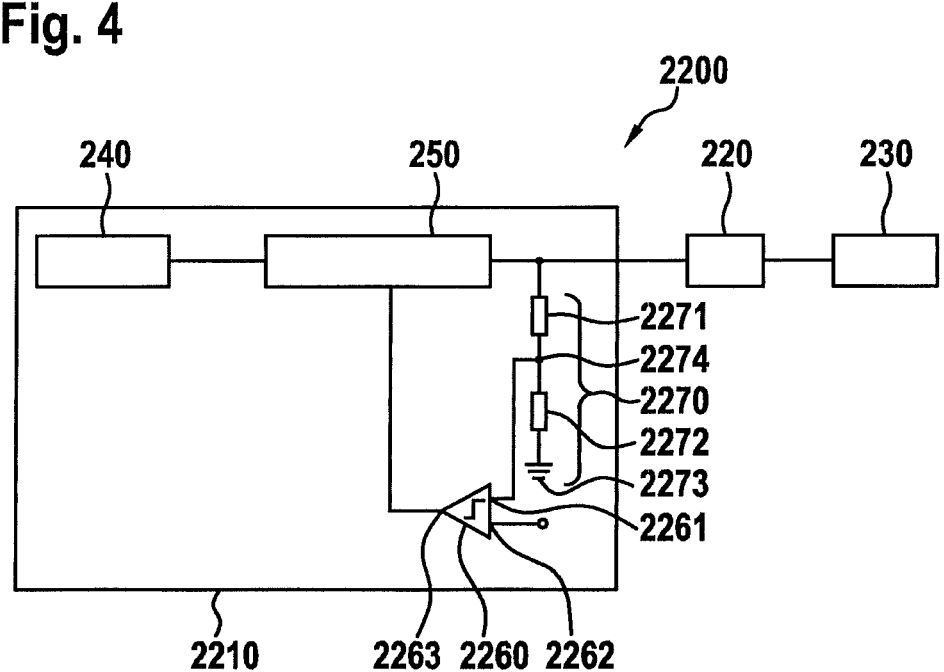
FIG. 4 shows a passenger protection system according to a third specific embodiment.

FIGS. 2, 3 and 4 show specific embodiments of passenger protection systems, in which a receiver circuit is set up to ascertain trigger instant 121, at which voltage pulse 111 output by the receiver circuit has resulted in a rise of voltage 110 applied at the bus line up to and beyond threshold value 104. This instant is ascertained by monitoring voltage 110 applied at the bus line. In FIGS. 2, 3 and 4 identical or identically acting components have been provided with the same reference numerals and are described only once when mentioned for the first time.

FIG. 2 shows a schematic representation of a passenger protection system 200 according to a first specific embodiment. Passenger protection system 200, for example, may be installed in a motor vehicle. Passenger protection system 200 includes a receiver circuit 210, a bus line 220, and a sensor 230. Receiver circuit 210 is used for receiving measured data transmitted by sensor 230 via bus line 220. Receiver circuit 210, for example, may be designed as a control unit. Bus line 220 is utilized for the synchronous data transmission between sensor 230 and receiver circuit 210. For instance, bus line 220 may be part of a current interface. In this case a ground line, which is not shown in FIG. 2, would then be necessary in addition to bus line 220. Apart from sensor 230, passenger protection system 200 may include additional sensors, which are likewise connected to bus line 220 in order to transmit data to receiver circuit 210.

Receiver circuit 210 includes a voltage supply 240, which applies supply voltage 103 to bus line 220. In addition, receiver circuit 210 includes additional circuit components 250, which are used to receive and analyze data that were transmitted by sensor 230 via bus line 220.

Receiver circuit 210 has a comparator 260 for ascertaining trigger instant 121. Comparator 260 has a first input 261, a second input 262 and an output 263. First input 261 of comparator 260 is connected to bus line 220. A reference voltage having the magnitude of threshold value 104 is supplied to comparator 260 via second input 262. Second input 262 may be connected to its own voltage source for this purpose.

Output 263 of comparator 260 is connected to the further circuit components 250. As soon as voltage 110 applied at bus line 220 reaches threshold value 104, i.e., at trigger instant 121, comparator 260 outputs a corresponding signal to further circuit components 250 via its output 263. As a result further circuit components 250 are aware of trigger instant 121 and are able to calculate a starting instant for the receiving of data by receiver circuit 210 based on trigger instant 121.

FIG. 3 shows a passenger protection system 1200 according to a second specific embodiment. Passenger protection system 1200 has a receiver circuit 1210. In contrast to receiver circuit 210 of passenger protection system 200, receiver circuit 1210 of passenger protection system 1200 includes a comparator 1260 having a first input 1261, a second input 1262, and an output 1263. First input 1261 of comparator 1260 is once again connected to bus line 220. Second input 1262 of comparator 1260 is connected to a voltage source 1270, which is situated between second input 1262 and voltage supply 240. Voltage source 1270 is set up to generate a voltage, whose magnitude corresponds to the difference between threshold value 104 and supply voltage 103. Since voltage source 1270 is switched with respect to voltage supply 240, the effective voltage that comes about at second input 1262 of comparator 1260 once again corresponds to threshold value 104. This enables comparator 1260, as well, to ascertain when voltage 110 applied at bus line 220 reaches threshold value 104. In this case comparator 1260 again outputs a corresponding signal via its output 1263 to further circuit components 250.

FIG. 4 shows a passenger protection system 2200 according to a third specific embodiment. Passenger protection system 2200 has a receiver circuit 2210. Instead of comparator 260, receiver circuit 2210 has a comparator 2260 having a first input 2261, a second input 2262, and an output 2263. First input 2261 of comparator 2260 is connected to bus line 220 via a voltage divider 2270. Voltage divider 2270 includes a first resistor 2271 and a second resistor 2272. First resistor 2271 is situated between bus line 220 and an intermediate node 2274. Second resistor 2272 is disposed between intermediate node 2274 and a ground contact 2273. First input 2261 of comparator 2260 is connected to intermediate node 2274. Output 2263 of comparator 2260 is once again connected to the further circuit components 250.

The split voltage applied at first input 2261 corresponds to voltage 110 applied at bus line 220, multiplied by the quotient from the resistance of second resistor 2270 and the sum of the resistances of first resistor 2271 and second resistor 2272. Via second input 2262, a reference voltage is then supplied to comparator 2260, whose magnitude corresponds to threshold value 104, multiplied by the quotient from the magnitude of second resistor 2272 and the sum of the resistances of first resistor 2271 and second resistor 2272. In this way comparator 2260, too, is able to ascertain when voltage 110 applied at bus line 220 reaches threshold value 104. However, the voltages applied at inputs 2261, 2262 have smaller values, so that comparator 2260 is able to be operated at a lower supply voltage in comparison to comparators 260, 1260. This reduces the power consumption of comparator 2260 and the waste heat generated by comparator 2260. The silicon surface required for realizing receiver circuit 2210 and the complexity of receiver circuit 2210 are therefore reduced in an advantageous manner.

Supply voltage 103 may amount to a few volt. For example, supply voltage 103 may have a value of 6.7 V. Pulse amplitude voltage 105, for instance, may have a value of approximately 9V. Period length 138 may be 500 µs, for example. Period length 137, for instance, may amount to 40 µs.

What is claimed is:

1. A circuit system, comprising:
 a receiver device that includes:
 a receiver circuit which generates, and outputs via a bus line to one or more transmitter devices that are connected to the receiver device via the bus line, a periodic voltage pulse; and
 an ascertaining device configured to ascertain whether a voltage on the bus line has reached a specified threshold value in response to the voltage pulse output by the receiver circuit;
 wherein the receiver device is configured to start a reception of data signals from the one or more transmitter devices a specified time period after an instant at which the voltage on the bus line has been determined by the ascertaining device to have reached the specified threshold value.

2. The circuit system as recited in claim 1, wherein the ascertaining device includes a comparator having a first input connected to the bus line.

3. The circuit system as recited in claim 2, wherein the first input of the comparator is connected to the bus line via a voltage divider.

4. The circuit system as recited in claim 3, wherein a second input of the comparator is connected to a voltage source.

5. The circuit system as recited in claim 4, wherein the receiver device is configured to receive the data signals via the bus line.

6. The circuit system as recited in claim 5, wherein the data signals are emitted by each of the one or more transmitter devices onto the bus line after a specified transmitter delay time following the instant at which the voltage on the bus line has reached the specified threshold.

7. A passenger protection system for a motor vehicle, comprising:
 a sensor;
 a bus line; and
 a receiver that is communicatively coupled to the sensor via the bus line and that includes:
 (i) a receiver circuit which generates, and outputs via the bus line and to the sensor, a periodic voltage pulse; and
 (ii) an ascertaining device configured to ascertain whether the voltage on the bus line has reached a specified threshold value in response to the voltage pulse output by the receiver circuit;
 wherein the receiver device is configured to start a reception of data signals from the sensor a specified time period after an instant at which the voltage on the bus line has been determined by the ascertaining device to have reached the specified threshold value.

8. The passenger protection system as recited in claim 7, wherein the bus line is configured as a current interface.

9. A method for operating a receiver circuit, the method comprising:
 the receiver circuit generating and outputting, via a bus line and to one or more transmitter devices that are communicatively coupled to the receiver circuit via the bus line, a periodic voltage pulse; and ascertaining, by the receiver circuit, an instant at which a voltage on the bus line reaches a specified threshold value in response to the voltage pulse output by the receiver circuit; and based on the ascertained instant, starting, by the receiver circuit, a reception of data signals from the one or more transmitter devices a specified time period after the ascertained instant at which the voltage on the bus line has been determined to have reached the specified threshold value.

10. The method as recited in claim 9, wherein the periodically output voltage pulse is used for synchronization of the receiver circuit with the one or more transmitter devices connected to the bus line.

11. The method as recited in claim 10, wherein the one or more transmitter devices are configured to set a start of a respective transmission period in which to output a data signal onto the bus line following a respective specified transmitter delay time after the voltage of the voltage pulse has reached the threshold value.

12. The passenger protection system as recited in claim 7, wherein the sensor is configured to begin a transmission of the data signals based on a detection of the voltage pulse.

13. The passenger protection system as recited in claim 12, wherein the sensor is configured to detect a reaching of the specified threshold value by the voltage on the bus line as the detection of the voltage pulse.

14. The circuit system as recited in claim 1, wherein the outputting of the voltage pulse by the receiver circuit causes the voltage on the bus line to rise with a rising edge.

15. The circuit system as recited in claim 14, wherein the rising edge is from a low voltage value to a high voltage value, with the specified threshold value being between the low voltage value and the high voltage value.

16. The circuit system as recited in claim 15, wherein the one or more transmitter devices are configured to:
  detect the voltage pulse generated and output by the receiver circuit once the voltage on the bus line reaches the specified threshold value; and
  output the data signals for reception by the receiver circuit in response to the detection of the voltage pulse.

* * * * *